Dec. 1, 1959     G. SONDER     2,915,280
NOZZLE AND SEAL ASSEMBLY
Filed April 18, 1957     2 Sheets-Sheet 1
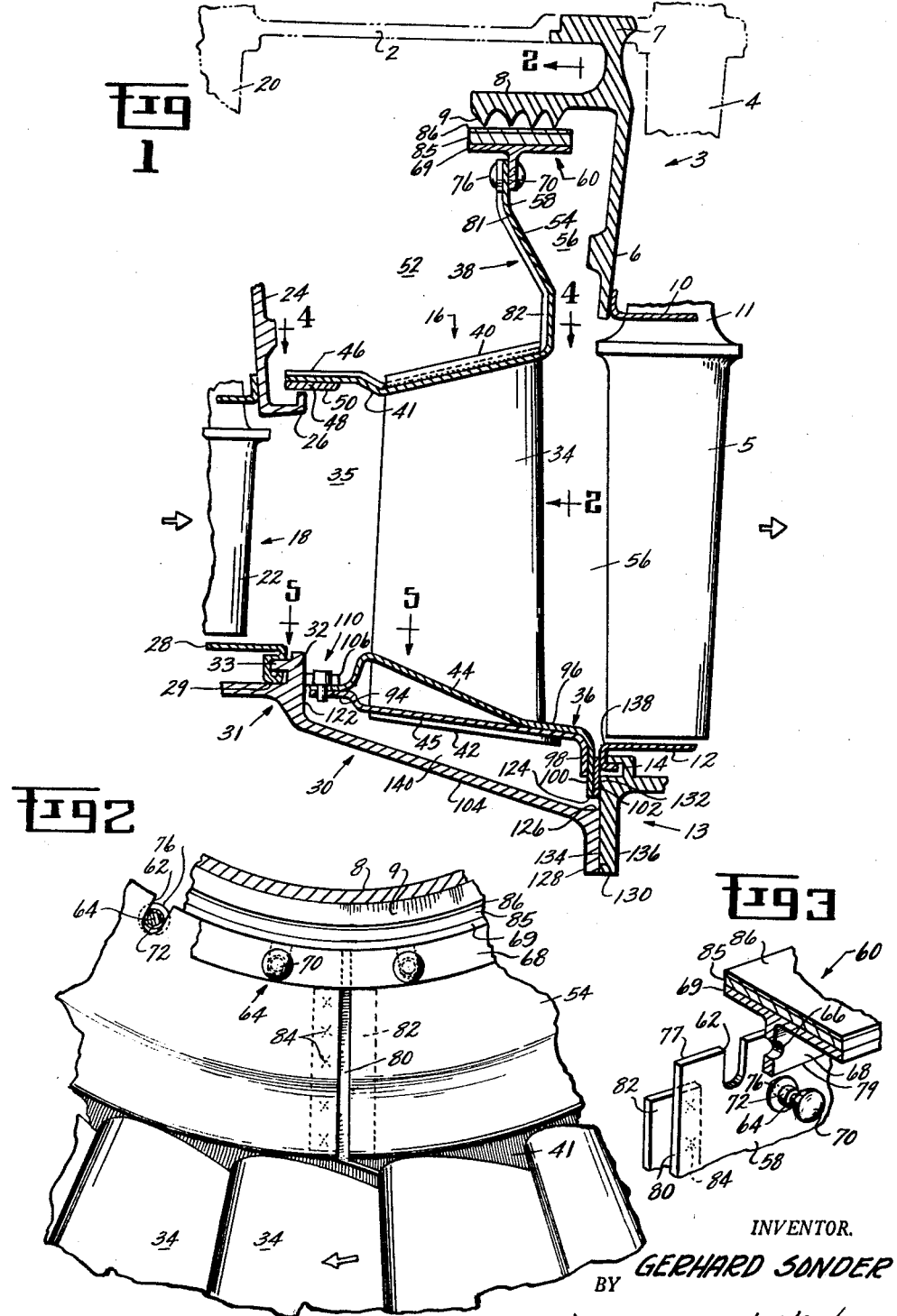
INVENTOR.
*GERHARD SONDER*
BY *Maurice H. Klitzman*
HIS ATTORNEY—

Dec. 1, 1959 G. SONDER 2,915,280
NOZZLE AND SEAL ASSEMBLY
Filed April 18, 1957 2 Sheets-Sheet 2

INVENTOR.
GERHARD SONDER
BY
Maurice N. Klitzman
HIS ATTORNEY—

United States Patent Office 2,915,280
Patented Dec. 1, 1959

2,915,280

NOZZLE AND SEAL ASSEMBLY

Gerhard Sonder, Cambridge, Mass., assignor to General Electric Company, a corporation of New York Application April 18, 1957, Serial No. 653,694

6 Claims. (Cl. 253—78)

The present invention relates to combustion gas turbines especially of the type which are used in small turbo engines for aircraft and more particularly it relates to nozzle assemblies used in such turbines.

An object of the present invention is to provide a gas turbine nozzle assembly in which undue thermal stresses due to differential thermal expansion and contraction of the various parts are kept at a minimum, in which the seals and bearings carried thereby are maintained in proper alignment at all times during engine operation, which parts can be assembled and disassembled in and from the turbine with a minimum of time, skill and labor and in which the use of a large number of small, separable, loose parts and hardware is eliminated.

Another object is to provide a nozzle assembly which carries an annular seal having an annular sealing surface adapted to cooperate with a rotating annular sealing surface of the turbine, in which the supporting structure between the seal and nozzle assembly permits relative radial movement therebetween to compensate for differential thermal expansion and contraction thereof while at the same time keeping the seal properly aligned and centered with respect to the nozzle assembly without the necessity of a large number of small, separable, loose parts and hardware as for example small, loosely held seal segments and garter springs, and in which such supporting structure also restrains the seal against rotation with respect to the nozzle assembly. Unless this relative movement is provided for, the temperature gradient between the nozzle assembly and seal causes undue stresses to be set up. Also, when the annular sealing surface of the seal is located radially with respect to the rotating annular sealing surface, as for example when the seal comprises a hollow cylinder with the inner cylindrical surface thereof cooperating with a rotating radially outwardly facing annular surface within the hollow member, the radial thermal expansion and contraction of the nozzle assembly and seal are apt to cause the annular sealing surfaces to be forced against each other with too great a pressure or to be forced away from each other. In such cases the annular sealing surface of the seal should be centered and otherwise properly positioned at all times with respect to the nozzle assembly and hence with respect to the rotating annular sealing surface with which it cooperates because otherwise the sealing surfaces are apt to be forced against each other with too great a pressure at one side thereby causing excessive friction and wear and even misalignment of the rotor and possible breakdown. Also, the other sides of the surfaces are forced away from each other, thereby breaking the seal. In accordance with the present invention, the sealing member is preferably held firmly by the nozzle assembly, preferably by an inner nozzle assembly ring, with a sealing surface of the sealing member in overlapping and abutting relationship with a sealing surface on the nozzle assembly to form a gas seal. The relative movement of the seal and nozzle assembly is guided, and the seal is kept centered and aligned with respect to the nozzle assembly and is restrained against rotation, by a plurality of circumferentially spaced guide members which are associated with either the seal or the nozzle assembly and which are received in a plurality of correspondingly circumferentially spaced radially extending slots associated with the other.

Another object is to provide a nozzle assembly which is simple to assemble and disassemble in and from the turbine, which is made up of a plurality of nozzle partitions fixed in an inner and outer nozzle ring to form a nozzle assembly unit and which is supported and carried by the turbine casing, the supporting structure between the nozzle assembly unit and casing permitting them to move at least radially but also preferably axially with respect to each other to compensate for differential thermal radial and axial expansion and contraction thereof while at the same time keeping the nozzle assembly properly centered and aligned with respect to the casing at all relative positions thereof without the necessity of a large number of small, loose separable parts and hardware as for example separable mounting bolts each of which must be individually adjusted to initially center the nozzle assembly during assembly in the casing, such supporting structure also restraining the nozzle assembly against rotation. The supporting structure of the casing and the portion of the nozzle assembly which cooperates therewith can be moved into operable and assembled position and hence the nozzle assembly can be easily assembled and disassembled in or from the casing by simply placing the nozzle assembly unit in or moving it out of the casing or moving the casing over the assembly unit. Preferably the turbine has a built up casing and the nozzle assembly is locked in its assembled position in which it has been placed as aforesaid by placing the casing part of the adjacent rotor assembly into assembled position with respect to the casing part of the nozzle assembly. The supporting structure between the nozzle assembly and casing includes a casing rabbet which serves to center the nozzle assembly with respect to the casing while the turbine is cold and during assembly thereof to thereby simplify assembly. Preferably the rabbet extends from the casing shell radially inwardly and then axially to provide a supporting surface facing radially outwardly and spaced radially inwardly from the casing shell. The relative axial and radial movement of the nozzle assembly and casing is guided, and the nozzle assembly is kept centered and otherwise aligned at all times with respect to the casing and restrained against rotation, by a plurality of circumferentially spaced, radially extending guide members which are associated with one of the casing and nozzle assemblies and which are received in a plurality of corresponding circumferentially spaced, axially elongated slots in the other. The importance of keeping the nozzle assembly correctly centered and aligned during turbine operation is apparent when it is realized that the nozzle assembly carries seals which must be centered and correctly positioned at all times as set forth above and in many cases it carries bearings which also must be centered and maintained in the correct radial position at all times. The relative radial and axial movement between the nozzle assembly and casing is necessary not only to make sure that the seals and bearings are correctly positioned but also to prevent undue stresses due to differential thermal expansion and contraction. Surfaces of the outer ring and casing fit snugly against each other during turbine operation to provide an effective seal between the upstream and downstream sides of the outer ring. The force applied to the nozzle assembly by the passage of combustion gases therethrough urges these sealing surfaces into snug engagement with each other at all times during turbine operation. Preferably the sealing surfaces of the casing comprises the radially extending surface of the casing part of the adjacent rotor assembly which engages the outer ring to lock the nozzle assembly in its casing part.

Another object is to provide a nozzle assembly which is carried and supported by the casing as above described and which itself supports and carries a seal as above described. In such a construction the novel and improved supporting structure between the outer ring and casing and the novel and improved supporting structure between the inner ring and seal cooperate with each other and the single nozzle assembly unit to further improve stress and characteristics and alignment of the seals and bearings carried by the nozzle assembly while at the same time maintaining the nozzle assembly gas tight except for the passage of gas through the annular passage in which the nozzle partitions are located.

Another object is to provide such a nozzle assembly in which one of the rings, preferably the inner ring, is provided with slits which divide the inner ring into a plurality of separate segments each of which has at least one nozzle partition anchored therein, whereby each segment is free to expand and contract radially and circumferentially independently of the others. A plate is provided to cover each slit and thereby prevent leakage therethrough while at the same time permitting relative circumferential and radial movement of the segment of the ring separated by the slit. This is done by attaching the plate to one of such segments and leaving it unattached to the other.

The construction of the present invention is particularly adapted for use in small turbo engines of the type described in application Serial No. 548,987, filed by G. W. Lawson November 25, 1955 and assigned to the same assignee and is especially useful in interstage nozzle assemblies requiring a seal between the stator assembly and the rotating rotor assembly. It is light, compact, simple in construction and easy to assemble and disassemble which are important features in this type of engine. In such engines the nozzle assembly is small enough to be picked up by one hand and placed in the casing as aforesaid. The turbine of such an engine is so small that it is difficult to utilize constructions requiring a large number of separable, loose parts and hardware. Such pieces are too small to handle economically and the turbine is too small to permit the assemblor to get at them. Furthermore, with small engines requiring a high ratio of power to weight, it is important that leakage of hot combustion gases through the nozzle assembly, except through the annular passage containing the nozzle partitions, be kept at a minimum and that the contact between the rotating and stationary surfaces be properly maintained so that there is a minimum of friction loss.

The above and other objects are affected by the present invention as will be apparent from the following description and claims and the accompanying drawings all of which describe and show by way of illustration only and without limitation what is now considered to be the preferred embodiment of the invention.

In the drawings:

Fig. 1 is a view in elevation and in section of an inter-stage nozzle assembly embodying the present invention and located between two rotor stages.

Fig. 2 is a section taken along the line 2—2 of Fig. 1.

Fig. 3 is an exploded, enlarged view, in perspective, of the supporting structure between the seal and the nozzle assembly.

Figure 4:
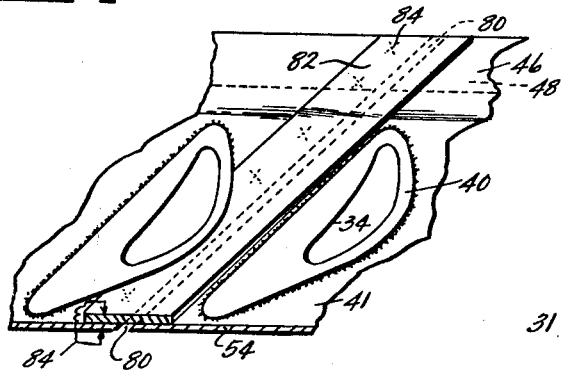
Figure 6:
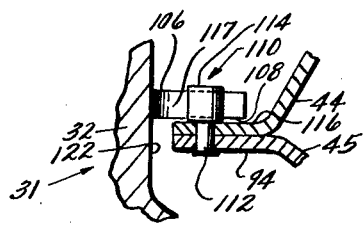
Figure 5:
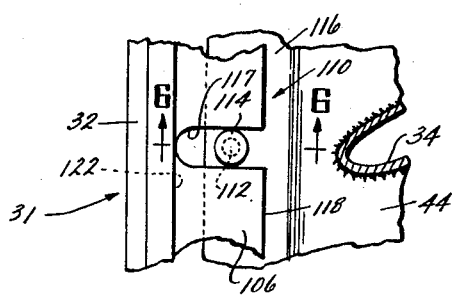
Figure 7:
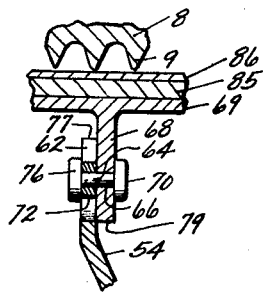

Fig. 4 is a view taken along the line 4—4 of Fig. 1.
Fig. 5 is a view taken along the line 5—5 of Fig. 1.
Fig. 6 is a view taken along the line 6—6 of Fig. 5.
Fig. 7 is an enlarged cross sectional view of the sealing member.

Referring to the drawings, 2 is a turbine rotor shaft of a turbo engine of the type described in application Serial No. 548,987, filed by Gerald W. Lawson on November 25, 1955 entitled "Gas Turbine Engine" and assigned to the assignee of this application. 3 designates an inter-stage rotor assembly having a rotor disc 4 which is removably attached to the shaft 2 by bolts (not shown), or other means to rotate therewith. 5 is one of a plurality of rotor turbine blades attached to the periphery of the disc 4 in the manner described in application Serial No. 630,612, filed by Gerhard Sonder on December 26, 1956 entitled "Gas Turbine Rotor" and assigned to the assignee of this application. 6 is a cooling plate similar in construction and function to the cooling plate described in the last mentioned application and which is attached to the rotor shaft 2 through hub 7 to rotate with the shaft 2 and disc 4. Plate 6 has a cylindrical shaped sealing lip 8 extending axially therefrom, the outer periphery of lip 8 has a plurality of axially spaced labyrinth sealing rings 9, and plate 6 also abuts against sealing ring 10 with a plurality of fingers extending between the shanks 11 of the blades 5 all as described in the above mentioned application. 12 designates an annular rotor shroud mounted on the rotor casing part 13 by means of a rabbet 14. 16 represents an inter-stage nozzle assembly between the rotor assembly stage 3 above described and the next rotor assembly stage 18 also made up of a rotor disc 20 having a plurality of rotor blades 22 and a baffle and cooling plate 24 mounted on the aft side of the rotor disc 20 for rotation therewith and having a shielding and cooling function similar to that of plate 6. The plate 24 has an axially extending flange having a sealing flange 26 extending radially inwardly thereof. The rotor assembly 18 has an annular rotor shroud 28 mounted in portion 29 of casing part 30 by a rabbet 31 comprising a radially inwardly extending part 32 and an axial extending part 33. The casing part 30 is separate from but attached to the casing part 13, the turbine casing being built up of a plurality of similar casing parts, each of which supports a nozzle assembly stage 16.

The nozzle assembly 16 is made up of a plurality of nozzle partitions 34 which are located in an annular space 35 between an annular, outer, tubular nozzle ring 36 and an annular inner nozzle ring 38. The inner ends 40 of the nozzle partitions 34 are secured in cooperating apertures in the nozzle portion 41 of the inner ring as by brazing and the outer ends 42 of the nozzle partitions are secured by brazing in cooperating apertures in the plates 44 and 45 which comprise the outer tubular ring 36.

The nozzle holding portion 41 of the inner ring 38 extends axially upstream into an axial end portion 46 having a rubbing or sealing cylindrical ring 48 on the radially outer surface thereof. Ring 48 has a sealing surface 50 which cooperates with rotating lip 26 to form a gas seal between the annular space 35 containing hot combustion gases and the interstage space 52.

The downstream axial end of ring 38 extends radially inwardly at 54 which forms a barrier between the space 56 containing hot combustion gases and the inter-stage space 52. Barrier member 54 extends radially inwardly into an annular flange or lip 58, as best seen in Figure 3, on which a hollow, cylindrically shaped sealing member 60 is mounted by means of a plurality of circumferentially spaced, radially elongated slots 62 in the edge of flange 58, each of which receives a pin 64 extending axially from and through an aperture 66 in an annular flange or lip 68 which extends radially outwardly from and is integral with the outer periphery of the casing 69 of the sealing member 60 and overlaps the flange 58 as shown. As best shown in Fig. 7, each pin 64 has a flat head portion 70 abutting against the downstream surface of the lip 68 and also has a spacer 72 through the central hole of which it is snugly received, which is located in the slot 62 and the diameter of which is such that it fits snugly between the opposite sides of the slot as shown. Portion 76 of the pin is peened over so that the two flanges 58 and 68 are held firmly together and against each other with the upstream surface of lip 68 and the downstream surface of lip 58 in snug contact with each other to form a seal between the space 56 and the interstage space 52. When the turbine is assembled and in the cold state the edge 77 of lip 58 is spaced from the cylindrical wall of casing 69 and the edge 79 of lip 68 is spaced from bend 81 in barrier 54 as shown in Fig. 1. The circumferentially spaced slots 62 with their cooperating pins 64, the spacing between the edge 77 and the outer periphery of member 69 and the spacing between the edge 79 and the bend 81 in the member 54 permit the inner ring and sealing member to move radially with respect to each other in response to differential thermal expansion and contraction thereof until the edge 77 abuts against the periphery of the casing 69 or the ends of the slots 62 strike the spacers 72 and at the same time the close fit between the opposite sides of the slots and the spacers 72 guides the movement of the parts, keeps the sealing member 60 centered with respect to the nozzle assembly at all relative positions thereof independently of the rotating rings 9 and restrains the sealing member against rotation with respect to the nozzle assembly. The pins 64 hold the sealing member firmly on the inner ring.

Referring now to Figures 2, 3, and 4 portions 41, 46, 54 and 58 of the inner ring 38 are divided into a plurality of separate segments by a plurality of slits 80 running diagonally from fore to aft as shown, each segment having anchored therein one or more partitions 34. Each slit has a plate 82 covering it and overlying the adjacent marginal portions of the two segments separated by it, the plate being welded as at 84 to a marginal portion of one of the segments separated by the slit and being unattached to the marginal portion of the other segment but fitting snugly thereagainst. Each plate extends from the upstream axial edge of portion 46 of the inner ring to the beginning of the slots 62, as shown in Fig. 3, the end of the plate overlying the flange portion 58 of the inner ring lying in the same plane. The slits 80 permit the separate segments of the inner ring to move radially and circumferentially with respect to each other in response to differential thermal expansion and contraction thereof while at the same time preventing gas leakage between spaces 52 and 56.

The sealing member 60 comprises the cylindrical casing 69 and a hollow cylindrical metallic member 85 contained therein. The inner surface of member 85 has a liner 86 of silver or some other material conventionally used for rubbing and sealing surfaces. The inner annular surface of the liner 86 is in sealing contact with the rotating labyrinth rings 9 to provide a labyrinth seal between spaces 52 and 56. The member 85 and casing 69 can be one integral piece.

The plates 44 and 45 of outer ring 36 are spaced apart from each other at their middle portions as shown in Fig. 1 and come together at their axial end portions which are brazed together. The upstream axial end portions form a supporting flange or lip 94 and the downstream axial end portions form a flange 96 which extends radially outwardly to form a lip 98, the plate 44 extending radially outwardly at 100 further than the plate 45, the portion 100 having attached thereto as by welding or brazing a sealing ring 102.

The whole nozzle assembly 16 and hence the sealing member 60 attached thereto are mounted in the portion 104 of casing part 30 by means of annular flange 94 and an annular rabbet portion 106 extending axially from the radially inwardly extending rabbet portion 32 of casing 30, the outer ring 36 being spaced radially inwardly from the shell portion 104 of the casing along its entire width as shown. As best seen in Fig. 6 flange 94 is mounted on the radially outwardly facing supporting surface 108 of rabbet 106 by means of a plurality of circumferentially spaced pins 110 each of which has a reduced portion 112 which is fixed in an aperture in the lip 94 of the outer ring and an enlarged portion 114 which extends radially inwardly of the inner surface 116 of flange 94 into an open slot 117 in the edge 118 of the rabbet portion 106, such slot being elongated in an axial direction. When the engine is cold the radially outwardly facing surface 108 of the rabbet 106 engages the radially inwardly facing surface 116 of flange 94 to center the outer ring 36 and hence the nozzle assembly 16 with respect to the casing. The edge of the lip 94 is spaced from the wall 122 of the radially inwardly extending portion 32 of the rabbet. Referring back to Figure 1, the edge 124 of the lip 100 and rubbing ring 102 is spaced from the internal surface 126 of the end portion of the casing part 30 opposite such edge 124 as shown. This end portion of the casing 30 extends radially outwardly into an end flange 128 the downstream surface 130 of which is aligned with the sealing surface 132 of the sealing ring 102. The surface 134 of radially outwardly extending end flange 136 of the casing part 13 for the rotor assembly 3 abuts and fits snugly against the sealing surface 132 of the ring 102 and the end surface 130 of the end flange 128, as shown, when the casing parts are assembled, to thereby lock the nozzle assembly 16 in assembled position in its casing part 30 as shown. The edge 138 of the rotor shroud 12 is also held against the surface 132 of ring 102 as shown. Flanges 128 and 136 of the casing parts are bolted together by bolts (not shown).

The radially inner portion of surface 134 of flange 136, the surfaces 108 and 122 of the rabbet 32 (as shown in Fig. 6), the inner face of the shell 104 of the casing 30 and the radially outer surface of ring 36 form a space 140 (Fig. 1). Since the axial distance between the surfaces 134 and 122 is greater than the axial distance of the outer ring between its surface 132 and to edge of lip 94, the outer ring is free to move axially with respect to the casing and rabbet and hence to thermally expand axially without undue stresses until the edge of lip 94 abuts against the wall 122 of the rabbet 32 with the surface 132 of the ring 102 also abutting against the surface 134 of flange 13. Also, since the outer ring 36 is spaced radially inwardly from the inner surface of the shell portion 104 of casing 30 along its entire width relative radial movement between the casing and the outer ring 36 and hence radial expansion of the outer ring and nozzle assembly outwardly away from the surface 108 of the rabbet portion 106 is permitted without causing undue stresses until the edge 124 of the lip 100 and sealing ring 102 strikes against the surface 126 of the casing. During both this axial and radial movement or expansion of the outer ring with respect to the casing the snug fit between the opposite sides of the circumferentially spaced slots 117 and the portions 114 of their cooperating pins 110 guides the movement of the ring, keeps the nozzle assembly centered with respect to the casing in all relative radial and axial positions thereof and restrains the nozzle assembly against rotation with respect to the casing. The forces applied to the nozzle partitions by the combustion gases passing therethrough urges the nozzle assembly in an aft direction to the position shown with the sealing surface 132 pressed against the surface 134 of flange 136 and the surface 138 of shroud 12 to provide a seal between spaces 140 and 56 and hence between spaces 52 and 56 at substantially all times.

When the engine is cold the various parts of the nozzle assembly, casing and sealing member are in the positions shown in the drawings. In starting up the engine, the hot combustion gases striking the nozzle partitions cause the nozzle assembly to heat rapidly and hence expand in a radial and axial direction while the casing and sealing member remain relatively cool and hence do not expand as much or as fast as the nozzle assembly. If no relative movement is provided between the nozzle assembly and casing and between the nozzle assembly and sealing member undue stresses would be set up and the sealing member 60 would be moved inwardly and pressed too tightly against the rings 9. Furthermore, the sealing surface 50 would move away from the lip 26. This is avoided by the construction of the present invention because it permits relative movement between the nozzle assembly and casing and between the nozzle assembly and sealing member. That is, when the nozzle partitions are heated, and expand at a greater rate than the relatively cooler casing and sealing member, the outer ring 36 moves radially outwardly away from rabbet 106 and inner ring 38 moves radially inwardly with respect to the sealing member, thereby avoiding undue stresses and preventing the sealing member from being pressed too tightly against the labyrinth rings and also, when the nozzle assembly supports a bearing member, preventing it from being pressed too tightly against the rotating surface bearing against it. Where this relative movement is provided without keeping the parts centered and properly aligned, one side 86 of the sealing surface of member 60 is apt to be pressed too tightly against the rings 9 thereby increasing friction and wear as well as wasting power. Furthermore, there is a danger of misalignment of the rotor causing breakdown of the engine. Furthermore, since the sealing member comprises a hollow cylinder and the rotating surface is annular the other sides of the sealing surfaces would be separated thereby breaking the seal. The centering mechanism of the present invention avoids this. This relative movement and centering of the present invention is provided without the necessity of a large amount of loose, separable parts and hardware and without permitting leakage of hot gases into the inter-stage space 52 since an effective seal is provided at all times between the nozzle assembly and casing (surfaces 132 and 134), between the sealing member and nozzle assembly (abutting surfaces of flanges 58 and 68) between the sealing member and rotor stage 3 (labyrinth seal 9 and 60) and between the nozzle assembly and rotor stage 18 (the lip 26 and rubbing ring 48). In fact, the construction of the present invention assures that all of these seals will be effective at all times regardless of differential expansion of the various parts of the turbine.

Since the notches 117 are open (see Fig. 5), the nozzle assembly unit with the sealing member attached thereto as shown can be assembled in the turbine by merely placing it in the downstream opening of the casing 30 and moving it to the position shown, the rabbet 106 aiding in centering the unit when it is placed in the casing and the pins being moved into the open ends of notches 117 to the operable assembled position shown, whereafter the nozzle assembly is locked into assembled position merely by placing the casing part 13 in the position shown and fastening the flanges 128 and 136 together. This makes assembly and disassembly very simple.

Although in the drawings the sealing member is free to move radially with respect to the nozzle assembly, provision can also be made to permit relative axial movement therebetween to prevent axially facing rotating and stationary sealing surfaces from being pressed too tightly against each other or moved too far away from each other due to thermal expansion and contraction.

With the use of the construction of the present invention undue stresses due to differential thermal expansion and contraction of the various parts of the turbine are avoided and at the same time various parts including sealing and bearing surfaces are kept centered in the proper position at all times so that they continue to function efficiently. Both radial and axial expansion are provided for and the same supporting structure which provides for the relative movement between the various parts also provides the centering and aligning and permits the simplified assembly and disassembly of the unit.

Although in the drawings the sealing member is shown cooperating with the lip of the cooling plate, it can cooperate with any rotating part, such as the rotor shaft or rotor disc.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What I claim as new and desire to secure by Letters Patent of the United States is:

1. In a gas turbine having a casing and a turbine wheel rotatable about an axis within said casing, a nozzle assembly forming a gas path for directing motive fluid to said turbine wheel, said nozzle assembly comprising a plurality of nozzle partitions circumferentially spaced about said axis, an inner ring in which radially inner ends of said partitions are fixed, an outer ring in which radially outer ends of said partitions are fixed, said outer ring terminating at axially opposite ends thereof in an axially extending lip and a radially extending lip, respectively, axially extending rabbet means formed in said casing and cooperating with said axially extending lip to provide a sole radial restraint on said nozzle assembly, a plurality of pins extending radially through said axially extending lip and cooperating in axially slidable relation with said rabbet means to provide a sole circumferential restraint on said nozzle assembly, and a flange formed in said casing and cooperating with said radially extending lip to provide a sole axial restraint upon said nozzle assembly, whereby said nozzle assembly is centered and supported in said casing for free thermal expansion axially and radially.

2. In a gas turbine having a casing and a turbine wheel rotatable about an axis within said casing, a nozzle assembly forming a gas path for directing motive fluid to said turbine wheel, said nozzle assembly comprising a plurality of nozzle partitions circumferentially spaced about said axis, an inner ring in which radially inner ends of said partitions are fixed, an outer ring in which radially outer ends of said partitions are fixed, said outer ring terminating at axially opposite ends thereof in an axially extending lip and a radially extending lip, respectively, axially extending rabbet means formed in said casing and cooperating in circumferential abutment with said axially extending lip to provide a sole radial restraint on said nozzle assembly, a plurality of axially elongated slits formed in said rabbet means, a plurality of pins extending radially through said axially extending lip and said axially elongated slits in axially slidable relation with said rabbet means to provide a sole circumferential restraint on said nozzle assembly, and a flange formed in said casing and cooperating with said radially extending lip to provide a sole axial restraint upon said nozzle assembly, whereby said nozzle assembly is centered and supported in said casing for free thermal expansion axially and radially.

3. In a gas turbine structure having a casing and a turbine wheel rotatable about an axis within said casing, a nozzle assembly forming a gas path for directing motive fluid to said turbine wheel, said nozzle assembly comprising a plurality of nozzle partitions circumferentially spaced about said axis, an inner ring in which radially inner ends of said partitions are fixed, sealing means carried by said inner ring and cooperating with portions of said gas turbine structure to seal said gas path radially inwardly of said nozzle assembly, an outer ring in which radially outer ends of said partitions are fixed, said outer ring terminating at axially opposite ends thereof in an axially extending lip and a radially extending lip, respectively, axially extending rabbet means formed in said casing and cooperating in circumferential abutment with said axially extending lip to provide a sole radial restraint on said nozzle assembly, a plurality of pins extending radially through said axially extending lip and cooperating in axially slidable relation with said rabbet means to provide a sole circumferential restraint on said nozzle assembly, a sealing ring disposed in axially abutting relationship to said radially extending lip, and a flange formed in said casing and cooperating with said sealing ring and said radially extending lip to seal said gas path radially outwardly of said nozzle assembly and to provide a sole axial restraint upon said nozzle assembly, whereby said nozzle assembly is centered and supported in said casing for free thermal expansion axially and radially.

4. In a gas turbine having a casing and a turbine wheel rotatable about an axis within said casing, a nozzle assembly forming a gas path for directing motive fluid to said turbine wheel, said nozzle assembly comprising a plurality of nozzle partitions circumferentially spaced about said axis, an inner ring circumferentially split into segments in which radially inner ends of said partitions are fixed, an outer ring in which radially outer ends of said partitions are fixed, said outer ring terminating at axial opposite ends thereof in an axially extending lip and a radially extending lip, respectively, axially extending rabbet means formed in said casing and cooperating in circumferential abutment with said axially extending lip to provide a sole radial restraint on said nozzle assembly, a plurality of pins extending radially through said axially extending lip and cooperating in axially slidable relation with said rabbet means to provide a sole circumferential restraint on said nozzle assembly, and a flange formed in said casing and cooperating with said radially extending lip to provide a sole axial restraint upon said nozzle assembly, whereby said nozzle assembly is centered and supported in said casing for free thermal expansion axially and radially, and said nozzle partitions are supported by said outer ring for free thermal expansion radially.

5. In a gas turbine having a casing and a turbine wheel rotatable about an axis within said casing, a nozzle assembly forming a gas path for directing motive fluid to said turbine wheel, said nozzle assembly comprising a plurality of nozzle partitions circumferentially spaced about said axis, an inner ring circumferentially split into segments in which radially inner ends of said partitions are fixed, an outer ring in which radially outer ends of said partitions are fixed, said outer ring terminating at axially opposite ends thereof in an axially extending lip and a radially extending lip, respectively, axially extending rabbet means formed in said casing and cooperating in circumferential abutment with said axially extending lip to provide a sole radial restraint on said nozzle assembly, a plurality of axially elongated slits formed in said rabbet means, a plurality of pins extending radially through said axially extending lip and said axially elongated slits in axially slidable relation with said rabbet means to provide a sole circumferential restraint on said nozzle assembly, and a flange formed in said casing and cooperating with said radially extending lip to provide a sole axial restraint upon said nozzle assembly, whereby said nozzle assembly is centered and supported in said casing for free thermal expansion axially and radially, and said nozzle partitions are supported by said outer ring for free thermal expansion radially.

6. In a gas turbine having a casing and a turbine wheel rotatable about an axis within said casing, a nozzle assembly forming a gas path for directing motive fluid to said turbine wheel, said nozzle assembly comprising a plurality of nozzle partitions circumferentially spaced about said axis, an outer ring in which radially outer ends of said partitions are fixed, said outer ring mounted in said casing for locating and supporting said nozzle assembly therein, an inner ring circumferentially formed with slits driving said inner ring into segments in which radially inner ends of said partitions are fixed, sealing means carried by said inner ring and cooperating with portions of said gas turbine structure to seal said gas path radially inwardly of said nozzle assembly, and a plurality of plates each overlying one of said slits in axially abutting gas-sealing relation with adjacent segments of said inner ring, each of said plates being secured to only one of said adjacent segments, whereby said segments are supported by said nozzle partitions for free relative thermal expansion radially.

References Cited in the file of this patent

UNITED STATES PATENTS

| | | |
|---|---|---|
| 2,427,244 | Warner | Sept. 9, 1947 |
| 2,488,867 | Judson | Nov. 22, 1949 |
| 2,605,997 | Lombard et al. | Aug. 5, 1952 |
| 2,628,067 | Lombard | Feb. 10, 1953 |
| 2,640,319 | Wislicenus | June 2, 1953 |
| 2,771,622 | Thorp | Nov. 27, 1956 |

FOREIGN PATENTS

| | | |
|---|---|---|
| 741,794 | Great Britain | Dec. 14, 1955 |
| 758,106 | Great Britain | Sept. 26, 1956 |

UNITED STATES PATENT OFFICE
CERTIFICATE OF CORRECTION

Patent No. 2,915,280 December 1, 1959

Gerhard Sonder

It is hereby certified that error appears in the printed specification of the above numbered patent requiring correction and that the said Letters Patent should read as corrected below.

Column 10, line 26, for "driving" read -- dividing --.

Signed and sealed this 19th day of July 1960.

(SEAL)
Attest:

KARL H. AXLINE
Attesting Officer

ROBERT C. WATSON
Commissioner of Patents